Aug. 13, 1963 J. J. A. PEEK ETAL 3,100,852

VARIABLE RELUCTANCE MAGNETIC CIRCUIT

Filed June 24, 1957

INVENTORS
JOHANNES JOSEPHUS ALPHONSUS PEEK
HERRE RINIA
SIMON DUINKER
BY
Frank R. Jifari
AGENT 3,100,852
Patented Aug. 13, 1963

3,100,852

VARIABLE RELUCTANCE MAGNETIC CIRCUIT

Johannes Josephus Alphonsus Peek, Herre Rinia, and Simon Duinker, all of Eindhoven, Netherlands, assignors to North American Philips Company, Inc., New York, N.Y., a corporation of Delaware Filed June 24, 1957, Ser. No. 667,619
Claims priority, application Netherlands July 28, 1956
10 Claims. (Cl. 310—15)

This invention relates to magnetic circuits and devices, and in particular to these circuits and devices which operate with variable reluctance.

Known circuits and devices of the foregoing type generally include an airgap and within the airgap a slidable, soft ferromagnetic member which controls the reluctance of the magnetic circuit by its position in the gap. For instance, when the slidable member completely fills the gap, the reluctance is minimized, whereas when the soft magnetic member is absent from the gap, the reluctance is maximized. These circuits and devices have disadvantages, which derive from the limited motions possible by the soft magnetic member which controls or adjusts the reluctance of the circuits, the limited range of adjustments possible, and the complicated assemblies that sometimes result.

One object of the invention is to provide a new magnetic circuit or device containing variable reluctance means of a type different from that heretofore used.

Another object of the invention is to provide a magnetic circuit and device whose reluctance may be controlled by provision of a rotatable, soft, magnetic member.

These and other objects of the invention are realized in accordance with the invention by providing in series in a magnetic circuit a movable, soft, ferromagnetic member possessing different magnet permeabilities along different directions. Thus, by orienting this member so that its high-permeability direction is aligned with the flux direction in the circuit, the reluctance offered by the movable member to that flux flow is minimized. On the other hand, by orienting this member so that its low-permeability direction is aligned with the flux flow, the reluctance of the magnetic circuit is maximized. In this way, it has been found that continuous control of the reluctance of a magnetic circuit or magnetic device may be accomplished with simple and thus readily manufactured components. Moreover, it has been found that the range of variation of reluctance is extremely large. While the broad aspects of the invention permit the construction of a wide variety of magnetic devices and circuits, particular improvements are obtained in the manufacture of variable inductors, or transformers requiring means for adjusting the mutual inductance between its windings. In addition, the invention may be used to construct electromechanical transducers, such as a magnetic pick-up, and may also be used to construct motors and the like.

The invention will now be described in greater detail with reference to the accompanying drawing, in which.

Figure 1:
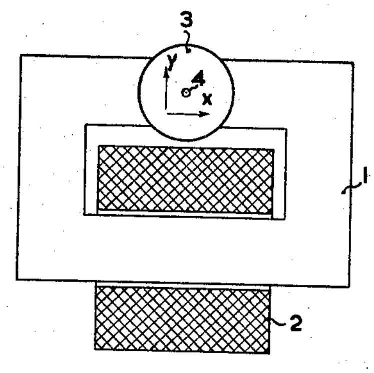
FIG. 1 is a plan view of a variable inductor constructed in accordance with the invention.

Referring now to the drawing, FIG. 1 shows a magnetic circuit for a variable inductor. The inductor comprises a closed core 1 of soft magnetic material, such as the well-known ferromagnetic ferrites. On the core 1 is mounted an exciting winding 2. The core 1 contains a cylindrical bore in which is mounted for rotation a right-circular, solid cylinder 3 constituted of anisotropic, soft, magnetic material, as will shortly be explained. This soft, magnetic member 3, which may project from the bore, is rotatable about its central axis 4. As will be noted, the diameter of the cylinder 3 is a greater than the width of the core 1 to ensure that the member 3 is in series in the circuit.

The magnetic member 3 possesses different magnetic permeabilities in two mutually perpendicular directions at right angles to the axis of rotation 4. For example, in the X-direction indicated by the horizontal arrow, the permeability of the member 3 may be ten to twenty times higher than its permeability in the Y-direction, indicated by the vertical arrow. In particular, the magnetic member 3 possesses a higher permeability in all directions parallel to a horizontal plane through the center axis 4 and orthogonal to the plane of the drawing than in any direction perpendicular to said plane. Such a magnetic member 3 may be made as described in a co-pending United States application, Serial No. 662,386, filed May 29, 1957, now Patent No. 3,013,976. As one illustrative example, the member 3 may be composed of a barium-cobalt-iron oxide compound having the formula $$Ba_3Co_2Fe^{III}{}_{24}O_{41}$$

The member 3 may be made by compressing suitable powder to form a block in a magnetic field which can be represented by a vector rotating in a plane at right angles to the direction of compression, which has the effect of orienting the powder particles so that their preferred planes of magnetization lie in parallel. After compression, the block may be sintered in an oxygen-containing atmosphere. From the block may be carved the cylindrical member illustrated in the drawing with the required orientation. In general, suitable materials for the magnetic member 3 will be found among non-metallic or ceramic, ferromagnetic materials of the non-cubic crystalline type having a preferred plane of magnetization. For instance materials having the formulae $BaZnFe_6O_{11}$ or $BaCo_{0,8}Zn_{1,2}Fe_{16}O_{27}$ or $BaCo_{1,2}Ti_{1,2}Fe_2O_{19}$ may be used either. As the material is non-metallic, eddy current losses are kept to a minimum. The material is especially useful in magnetic circuits operative at the higher frequencies. For convenience, magnetic members like the member 3 constituted of a solid block of magnetic material but possessing different permeabilities in different directions will be referred to as an anisotropic soft, magnetic member.

As a consequence of this construction of the member 3, its permeability in the X-direction and all directions parallel thereto, is much higher than in the Y-direction and parallel directions. Thus, in the position of the rotatable member 3 shown in the drawing, the reluctance of the magnetic circuit is a minimum, as the cylinder 3 exhibits very low reluctance by reason of its high permeability in the flux direction, which is, of course, horizontal in the upper leg of the core 1. However, by rotating it about the axis 4 by 90°, either clockwise or counterclockwise, the Y-direction then becomes aligned with the flux flow, and in that Y-direction the member 3 has a minimum permeability and thus a maximum reluctance. In this case, the reluctance of the magnetic circuit is maximized. Of course, for positions of the member 3 intermediate these two extremes, the reluctance of the cylinder 3 will vary between its minimum and maximum values, and so will the reluctance of the circuit. With the material described above, it has been found possible to provide a ratio of maximum to minimum permeability of about 10:1 to 20:1, which provides a wide range of variation of the reluctance of the magnetic circuit shown.

Figure 2:
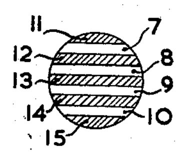
FIG. 2 is a cross-sectional view of a possible modification of the device shown in FIG. 1, which modification, however, produces much inferior results.

Another advantage of the foregoing constructions stems from the fact that in the position of maximum permeability, the cylindrical bore in the core 1 is filled completely with magnetic material permitting the flow of flux therethrough. This is in contrast to a construction as shown in FIG. 2, which shows a cylinder having a similar shape to the cylinder 3 of FIG. 1 but in this case constituted of a plurality of ordinary, soft, magnetic layers 11, 12, 13, 14 and 15 separated by non-magnetic layers 7, 8, 9 and 10. Here the reluctance in the horizontal direction is less than that in a vertical direction, since in the latter position the nonmagnetic members are in series and thus impede the flow of flux. However, not only is this laminated member more difficult to construct, but the same large ratio of maximum to minimum permeability found in the member 3 described above is lacking, because even in the low reluctance position of the cylinder, there is interposed in the flux path the nonmagnetic members 7 to 10, inclusive. The embodiment illustrated in FIG. 1 produces far superior results to that illustrated in FIG. 2.

It will be obvious from the foregoing that the rotatable member 3 need not be a right-circular cylinder, but may also have the form of any other solid of revolution. So, for example, the member 3 can be in the form of a cone, with, of course, the aperture in the core 1 having a complementary shape to accommodate the same.

Figure 3:
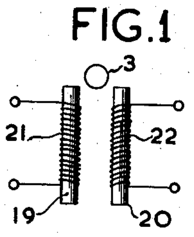
FIG. 3 is a side view of another embodiment of the invention relating to a transformer.

FIG. 3 shows a transformer comprising soft magnetic core members 19 and 20 of the usual material on which are mounted respectively, windings 21 and 22. In the usual manner, a soft, magnetic member may be provided between or in the vicinity of the windings to control the coupling therebetween. In accordance with the invention, this control member comprises a right-circular cylinder 3, as shown in FIG. 1, constituted of anisotropic soft, magnetic material also as described in connection with FIG. 1. This member 3 is rotatable about an axis at right angles to the plane of the drawing. The coupling between the windings is maximized by rotating the member 3 to a position where its direction of lowest permeability, corresponding to the Y-direction in FIG. 1, is parallel to the longitudinal axes of the cores 19 and 20, which direction is vertical in FIG. 3, so that a low reluctance path exists between the cores 19 and 20. Of course, in a position rotated 90° from this position, the coupling between the windings is minimized. By a proper arrangement of the transformer elements shown, which is within the skill of those skilled in this art, these changes in coupling can be obtained without any appreciable variation of the inductance of the windings 21 and 22.

Figure 4:
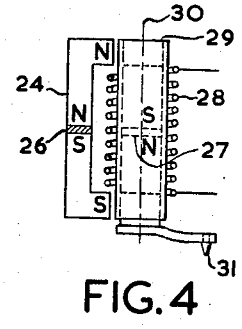
FIG. 4 is a side view of a magnetic pick-up in accordance with the invention.
Figure 5:
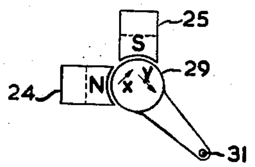
FIG. 5 is a plan view of the device shown in FIG. 4.

FIGS. 4 and 5 show an electromechanical transducer in accordance with the invention. In particular, there is illustrated a magnetic pick-up for converting the undulations of the groove in a phonograph record into corresponding electrical energy. This pick-up comprises two parallel magnetic circuits including soft magnetic cores 24 and 25, respectively, and including therein biasing permanent magnets 26 and 27, respectively. As shown in the figures, the first magnetic circuit 24 has its magnet 26 biased in such a way that a pole established at its upper end has north polarity and one established at its lower end possesses south polarity. The magnetic circuit 25, which is similar in shape to the circuit 24 but mounted at right angles thereto, has the opposite biasing, so that its south pole is at its top and its north pole is at its bottom. At the junction of these poles there is rotatably mounted a right-circular cylinder 29 of anisotropic, soft, magnetic material. An output coil winding 28 is mounted on the cylinder 29. As shown in FIG. 5, the preferred planes of magnetization of the member 29 are parallel to a plane extending through the arrow indicated by X and perpendicular to the plane of the drawing. Hence, the cylinder 29 possesses a high permeability in its X-direction and in the direction of its axis, represented by numeral 30 in FIG. 4. On the other hand, the Y-direction in FIG. 5 represents a direction of low permeability. A stylus 31 is secured to the bottom end of the cylinder 29.

In operation, the stylus 31 engages the groove in a phonograph record, and, as is well-known in the art, the undulations of the rotating groove will cause the cylinder 29 to rotate about its axis 30. As will be noted from FIG. 5, the preferred X-direction is centrally and symmetrically aligned relative to the two magnetic circuits 24 and 25, so that the total reluctance of each circuit, which includes the rotatable member 29, is the same. Furthermore, the net flux flowing through the member 29, and thus intercepting the coil 28 is zero. However, a slight rotation of the cylinder 29 in a clockwise direction increases the reluctance of the magnetic circuit 25 and decreases the reluctance of the magnetic circuit 24, since in both cases the member 29 acts as a flux closing member. The net effect is to increase the biasing flux from the magnet 26, and to decrease the biasing flux of the magnet 27, through the cylinder 29, so that, with magnets of about equal strength, a resultant downwardly-directed field will intercept the coil 28. Similarly, a counterclockwise rotation from the position shown in FIG. 5 will result in an upwardly-directed field through the coil 28. Consequently, the vibrations of the stylus 31 resulting in the rotation of the cylinder 29 produces an alternating magnetic field linking the turns of the winding 28, and, in the usual way, induces a corresponding alternating voltage in the output winding 28. A novel result of this construction is the absence of the usual spring or biasing member tending to return the stylus 31, in the absence of groove undulations, to a center, stable position. This is because the cylinder 29 automatically assumes, if free to move, a position at the center such that the reluctance of both magnetic paths are minimized, which is the position shown in FIG. 5 of the drawing. In this case, the magnetic fields produced by the magnets 26 and 27 effectively neutralize each other in the cylinder 29. Other modifications may be made in the electromechanical transducer illustrated in FIGS. 4 and 5, such as providing additional magnetic circuits like 24 and 25 to cooperate with the cylinder 29 or by altering the space arrangement of the circuits 24 and 25, to attain different effects. Also, obviously, the entire member 24 and 25 may be constituted of a single C-shaped permanent magnet. As another possibility, the magnets 26 and 27 may be replaced by a single magnet mounted in series in the cylinder 29. In this case two windings would be necessary on the cores 24 and 25 instead of the single winding 28 on the member 29, with these two windings connected so that their outputs are in additive relationship.

Figure 6:
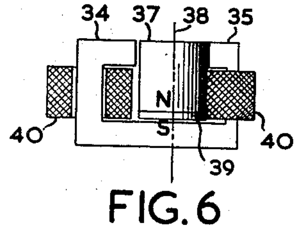
FIG. 6 is a side view of an electric machine in accordance with the invention.
Figure 7:
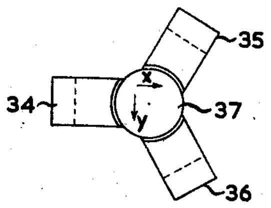
FIG. 7 is a plan view of the device shown in FIG. 6.

The electric machine shown in FIGS. 6 and 7 is based upon similar principles. It comprises, as shown in FIG. 7, three symmetrically-disposed, C-shaped, soft, magnetic cores 34, 35 and 36 of the usual soft magnetic material, jointly enclosing a cylinder 37 of anisotropic soft, magnetic material having a higher permeability in the X-direction and in the direction of its axis 38 than in the Y-direction. Secured to the bottom of the cylinder 37 is a thin magnet 39 with the polarity shown in FIG. 6. Windings 40 are mounted on each of the cores 34 to 36, inclusive. Rotation of the cylinder 37 about its axis 38 will induce in the windings 40 a three-phase current. Thus, a generator results. Similarly, passing three-phase current through the three windings 40 will cause the cylinder 37 to rotate even in the absence of the permanent magnet 39, because of its different permeabilities. In this latter connection, the operation is similar to that of a synchronous motor. By employing two magnetic circuits instead of the three shown, similar to that shown in FIGS. 4 and 5, there will result a two-phase motor.

While the invention has been described in connection with specific embodiments, it will be appreciated by those skilled in the art that other modifications thereof are possible without departing from the spirit and scope of the invention as defined in the appended claims.

What is claimed is:

1. A magnetic circuit comprising means for establishing a flow of flux in said circuit, and a rotatable member separate from said flux establishing means and having a magnetic portion for varying the reluctance of said circuit, said magnetic portion of said rotatable member being constituted substantially entirely of soft magnetic material and possessing substantially different permeabilities along mutually-perpendicular directions perpendicular to its axis of rotation.

2. A magnetic device comprising a magnetic circuit having an opening, means establishing a flow of flux in said circuit, and in series in said magnetic circuit a rotatable member separate from the flux establishing means and having a solid, homogeneous soft, magnetic portion for varying the reluctance of said circuit, said magnetic portion being a solid of revolution and substantially filling the opening and having, at right angles to its axis of rotation, substantially different permeabilities in mutually perpendicular directions.

3. A device as set forth in claim 2, wherein the magnetic portion is a solid selected from the group of cylinders and cones, and the magnetic circuit is a substantially closed magnetic circuit.

4. A device as set forth in claim 2 wherein the magnetic portion is constituted of a sintered, ceramic, ferromagnetic material having a non-cubic crystal structure.

5. An electromechanical transducer comprising a plurality of magnetic circuits, means for establishing flux flow in said circuits, and common to said plurality of circuits a rotatable magnetic member having a magnetic portion constituted substantially of soft magnetic material and possessing substantially different magnetic permeabilities, at right angles to its axis of rotation, in mutually-perpendicular directions.

6. A transducer as set forth in claim 5 wherein a winding is coupled to said magnetic circuits, and magnetic-field-producing means is associated with said rotatable member.

7. An electrical machine comprising a plurality of magnetic circuits, means for establishing flux flow in said circuits, and common to said plurality of circuits a rotatable magnetic member having a magnetic portion constituted substantially of soft magnetic material and possessing substantially different magnetic permeabilities, at right angles to its axis of rotation, in mutually-perpendicular directions, and windings on said plurality of circuits.

8. An electrical machine as set forth in claim 7 wherein a permanent magnet is mounted on said rotatable member.

9. An electromechanical transducer comprising a pair of non-opposed yoke members forming separate magnetic circuits and having a common opening, magnetic-field-producing means associated with each of the yoke members, a rotatable cylinder possessing substantially different magnetic permeabilities, at right angles to its axis of rotation, in mutually-perpendicular directions mounted for rotation in said common opening, and a winding surrounding said rotatable cylinder, said cylinder being constituted of a ceramic soft ferromagnetic material having a non-cubic crystal structure.

10. A magnetic circuit comprising means for establishing a flow of flux in said circuits, and a movable member in said circuit separate from the flux establishing means for varying the reluctance of said circuit, said movable member having a soft magnetic portion constituted of sintered, ceramic, ferromagnetic material having a non-cubic crystal structure, said soft magnetic portion in one position in the circuit possessing a given flux-carrying cross-sectional area but a relatively low permeability and thus a high reluctance to the flow of magnetic flux therethrough, said soft magnetic portion in another position in the circuit possessing a flux-carrying cross-sectional area at least equal to said given area but a high permeability and thus a low reluctance to the flow of magnetic flux therethrough.

References Cited in the file of this patent

UNITED STATES PATENTS

| | | |
|---|---|---|
| 659,716 | Thomson | Oct. 16, 1900 |
| 921,311 | Thorardson | May 11, 1909 |
| 1,723,322 | Andorff | Aug. 6, 1929 |
| 1,809,197 | Fendrich | June 9, 1931 |
| 2,101,665 | Arey et al. | Dec. 7, 1937 |
| 2,426,322 | Pridham | Aug. 26, 1947 |
| 2,708,245 | Werner | May 10, 1955 |
| 2,775,716 | Valeton | Dec. 25, 1956 |
| 2,803,765 | Timmerman | Aug. 20, 1957 |
| 2,900,344 | Stuyts et al. | Aug. 18, 1959 |

FOREIGN PATENTS

| | | |
|---|---|---|
| 884,850 | France | May 8, 1943 |
| 672,140 | Great Britain | May 14, 1952 |
| 937,837 | Germany | Jan. 19, 1956 |